(12) United States Patent
Tamai et al.

(10) Patent No.: US 6,617,018 B2
(45) Date of Patent: Sep. 9, 2003

(54) FUNCTIONAL FILM

(75) Inventors: Kiminori Tamai, Chuo-ku (JP);
Tadayoshi Iijima, Chuo-ku (JP);
Chieko Yamada, Chuo-ku (JP);
Shigeyo Miyamori, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/859,386

(22) Filed: May 18, 2001

(65) Prior Publication Data
US 2002/0037399 A1 Mar. 28, 2002

(30) Foreign Application Priority Data

May 19, 2000 (JP) ........................................ 2000-148816

(51) Int. Cl.$^7$ ................................................. B32B 5/16
(52) U.S. Cl. .................... 428/328; 428/1.4; 428/323; 428/357; 428/372; 428/432; 428/702
(58) Field of Search ..................... 428/323, 1.4, 432, 428/702, 357, 372, 328

(56) References Cited

U.S. PATENT DOCUMENTS 5,662,962 A * 9/1997 Kawata et al. ............ 427/126.2
6,221,543 B1 * 4/2001 Guehler et al. ................ 430/7

FOREIGN PATENT DOCUMENTS

| EP | 0 599 246 | 6/1994 |
| JP | 1-174538 | 7/1989 |
| JP | 4-237908 | 8/1992 |
| JP | 6-13785 | 1/1994 |
| JP | 7-81015 | 3/1995 |
| JP | 7-172426 | 7/1995 |
| JP | 8-199096 | 8/1996 |
| JP | 8-253317 | 10/1996 |
| JP | 9-107195 | 4/1997 |
| JP | 9-109259 | 4/1997 |

\* cited by examiner

*Primary Examiner*—Paul Thibodeau
*Assistant Examiner*—Christopher Paulraj
(74) *Attorney, Agent, or Firm*—Oblon, Spivak, McClelland, Maier & Neustadt, P.C.

(57) ABSTRACT

A functional film of the invention includes a microparticulate-containing layer containing functional microparticulates. The microparticulate-containing layer inhibits the occurrence of cracks even when drawn 10%. When the functional film includes a microparticulate-containing layer containing conductive microparticulates, the microparticulate-containing layer exhibits a surface resistivity after drawn 10% which is at most 10 times greater than the surface resistivity prior to drawing. The invention thus implements a functional film which is unsusceptible to reduction or loss of its function due to deformation.

14 Claims, 3 Drawing Sheets

FUNCTIONAL FILM

BACKGROUND OF THE INVENTION

1. Technical Field

This invention relates to a functional film. The term "functional film" used herein is defined as follows. That is, the functional film is a film having a function, while the function denotes an action made through a physical and/or chemical phenomenon. The functional films include films having a variety of functions such as, for example, conductive film, magnetic film, ferromagnetic film, dielectric film, ferroelectric film, electrochromic film, electroluminescent film, insulating film, light-absorbing film, selective light-absorbing film, reflective film, anti-reflection film, catalyst film and photocatalyst film.

More particularly, the invention relates to a transparent conductive film. The transparent conductive film can be used not only as electroluminescent panel electrodes, electrochromic device electrodes, liquid crystal electrodes, transparent film heaters and touch panel transparent electrodes, but also as transparent electromagnetic wave shielding films.

2. Background Art

In the prior art, functional films formed of various functional materials are prepared by physical vapor phase deposition (PVD) techniques such as vacuum evaporation, laser ablation, sputtering, and ion plating and chemical vapor phase deposition (CVD) techniques such as thermal CVD, photo CVD and plasma CVD. These techniques generally need large size apparatus, some of which are inadequate to form large surface area films.

Also known in the art is the formation of film by coating using a sol-gel process. The sol-gel process is suited to form large surface area films, but often requires sintering of inorganic material at high temperature after coating.

Referring to transparent conductive films, for example, their detail is described below. At present, transparent conductive films are prepared most often by a sputtering process. The sputtering process, though including a variety of ways, typically involves generating inert gas ions in vacuum by a DC or high-frequency discharge, accelerating the ions for impingement against a target surface, ejecting target constituent atoms from the surface, and depositing them on a substrate surface to form a film.

The sputtering process is advantageous in that a conductive film with a low surface resistivity can be formed even over a relatively large surface area. However, it has the drawbacks of a large size of apparatus and a slow deposition rate. If the surface area of conductive film will increase in the future, the apparatus will be further increased in size. This means that technical problems arise in that a higher precision of control is needed, and from an economical aspect, the manufacturing cost increases. As a complement to the slow deposition rate, it is customary for the sputtering process to use an increased number of targets to increase the deposition rate, which also causes the apparatus to increase in size.

It has also been attempted to form transparent conductive films by a coating process. The conventional coating process forms a conductive film by applying a conductive paint having conductive microparticulates dispersed in a binder solution onto a substrate, followed by drying and curing. The coating process has advantages including ease of formation of conductive film having a large surface area, use of simple apparatus, high productivity, and preparation of conductive film at a lower cost than the sputtering process. In the coating process, conductive microparticulates contact with each other to form conductive paths exerting electric conductivity. However, conductive microparticulates are in insufficient contact in the conductive film prepared by the conventional coating process, resulting in the drawback that the conductive film has a high resistivity or poor electrical conductivity and its use is restricted.

As a typical method of preparing transparent conductive films by the conventional coating process, for example, JP-A 9-109259 discloses a preparation method involving the first step of applying a paint of conductive powder in a binder resin to a transfer plastic film and drying the coating to form a conductive layer, the second step of treating the conductive layer under a pressure (5 to 100 kg/cm$^2$) and heat (70 to 180° C.) for smoothing its surface, and the third step of stacking such conductive layers on a plastic film or sheet followed by thermocompression.

This method fails to produce a transparent conductive film having a low resistivity because a large amount of the binder resin is used, specifically 100 to 500 parts by weight of conductive powder per 100 parts by weight of the binder in the event of inorganic conductive powder, and 0.1 to 30 parts by weight of conductive powder per 100 parts by weight of the binder in the event of organic conductive powder.

Also, JP-A 8-199096 discloses a method applying to a glass plate a conductive film-forming paint consisting of tin-doped indium oxide (ITO) powder, a solvent, a coupling agent and an organic or inorganic acid salt of metal, but free of a binder and firing at a temperature of 300° C. or higher. Since no binder is used in this method, the conductive film has a low resistivity. However, since the firing step at a temperature of 300° C. or higher is essential, it becomes difficult to form a conductive film on a resin film or similar support having a low heat resistant temperature. Specifically, the resin film can be melted or carbonized or burned when heated at high temperature. The heat resistant temperature of resin film varies with the identity of resin, and polyethylene terephthalate (PET) film, for example, presumably has a limit temperature of 130° C.

Aside from the coating process, JP-A 6-13785 discloses a conductive coating including a consolidated powder layer in which at least some, preferably all, of voids in a skeletal structure made of conductive material (metal or alloy) are filled with resin, and an underlying resin layer. Its preparation method is described by referring to the formation of a coating on a plate as a typical example. According to the above-cited patent, a resin, a powder material (metal or alloy) and a plate serving as a member to be treated are first vibrated or agitated in a vessel along with a coat-forming medium (steel balls having a diameter of several millimeters) whereby a resin layer is formed on the surface of the member to be treated. Then, the powder material is captured and secured to the resin layer by the tack of the resin layer. Further, the coat-forming medium being subject to vibration or agitation applies impact forces to the powder material being subject to vibration or agitation whereby a consolidated powder layer is formed. This method requires a substantial amount of resin in order to exert the anchoring effect of the consolidated powder layer. Additionally, this method is more complicated than the coating process.

Yet aside from the coating process, JP-A 9-107195 discloses a method involving spraying and depositing conductive short fibers on a film of PVC or the like, followed by pressure treatment to form a conductive fiber/resin integrated layer. The conductive short fibers used herein include short fibers of polyethylene terephthalate or the like which have been metallized as by nickel plating. The pressure treatment is preferably effected under temperature conditions where the resin matrix layer exhibits a thermoplastic behavior, for example, high temperature/low pressure conditions of 175° C. and 20 kg/cm$^2$ as described in the above patent.

SUMMARY OF THE INVENTION

Meanwhile, there are recently increasing applications where functional films including conductive films are used in a flexible state. Transparent conductive films, for example, are used as flexible type touch panels, EL electrodes and the like. However, functional films of the flexible type are prone to deformations such as bending, folding and elongation under external forces. This often results in a lowering or loss of function, for example, an increase of electrical resistance and electrical disconnection in the case of conductive films. A lowering or loss of function by deformations occurs not only during the service of the functional film, but also by external forces applied during the preparation of the functional film itself, which causes a lowering of production yield.

The lowering or loss of function of functional film by deformation is ascertained for both the functional films containing a large amount of binder resin formed by the coating process and the functional films formed by the vapor phase deposition process such as sputtering.

The coating process has the advantages including ease of formation of functional film having a large surface area, use of simple apparatus, high productivity, and preparation of functional film at a low cost, but suffers from the problem that high function is achievable with difficulty. For example, when a conductive film is formed by the coating process, a problem of difficult lowering of electrical resistivity arises. By contrast, processes other than the coating process, for example, the vapor phase deposition process such as PVD or CVD suffers from such problems as an increased cost of apparatus and low productivity. Moreover, the sol-gel process and sintering process necessarily entail the step of heat treatment at relatively high temperatures and it is thus difficult to use a resin as the support on which the functional film is to be formed.

The present invention has been made under such circumstances and its object is to provide a functional film which substantially prevents any lowering or loss of its function by deformation.

The above object is achieved by the following constructions.

(1) A functional film comprising a microparticulate-containing layer containing functional microparticulates, wherein the microparticulate-containing layer inhibits the occurrence of cracks even when drawn 10%.

(2) The functional film of (1) wherein the microparticulate-containing layer is at least one selected from the group consisting of a conductive film, magnetic film, ferromagnetic film, dielectric film, ferroelectric film, electrochromic film, electroluminescent film, insulating film, light-absorbing film, selective light-absorbing film, reflective film, anti-reflection film, catalyst film and photo-catalyst film.

(3) A functional film comprising a microparticulate-containing layer containing conductive microparticulates, wherein the microparticulate-containing layer exhibits a surface resistivity after drawn 10% which is at most 10 times greater than the surface resistivity prior to drawing.

(4) The functional film of (3) wherein the conductive microparticulates are formed of at least one selected from the group consisting of tin oxide, indium oxide, zinc oxide, cadmium oxide, antimony-doped tin oxide (ATO), fluorine-doped tin oxide (FTO), tin-doped indium oxide (ITO), and aluminum-doped zinc oxide (AZO).

(5) The functional film of any one of (1) to (4) which is provided on a support.

(6) The functional film of (5) wherein the support is made of a resin.

With respect to the coating process, it is believed in the art that a large amount of binder resin must be used before a functional film can be formed; or in the absence of binder resin, the functional material must be sintered at high temperature before a functional film can be formed.

Making extensive investigations, quite surprisingly, the inventor has found that a functional film can be formed simply by compressing a functional microparticulate-containing coating, without a need for a large amount of binder resin or firing at high temperature.

Additionally, the functional film resulting from compression has a fully high mechanical strength and a high function such as low electrical resistivity. No cracks occur even when the film is drawn 10%. Also where the film is an electrically conductive film, the surface resistivity after drawing is within 10 times greater than the surface resistivity prior to drawing, indicating a small reduction of the function. Accordingly, a functional film exhibiting high function, high reliability and high durability is implemented by the invention.

DESCRIPTION OF THE PREFERRED EMBODIMENTS

Figure 1:
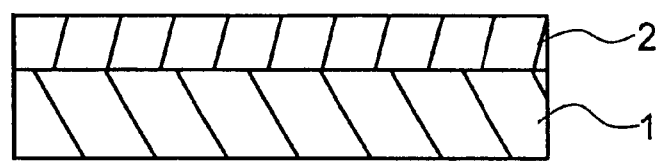
FIG. 1 is a schematic cross-sectional view of a functional film according to one embodiment of the invention.

According to the invention, as described above, a functional film having a fully high mechanical strength and a high function can be formed without a need for a large amount of binder resin or firing at high temperature.

The functional film of the invention has a microparticulate-containing layer containing functional microparticulates. The microparticulate-containing layer is characterized in that no cracks occur even when the layer is drawn 10%. In contrast, cracks occur in the sputtered film by a lower degree of drawing.

The inventive microparticulate-containing layer does not contain a resin as the binder or contains only such an amount of a resin that it may not function as the binder, at least during the compression. Therefore, when the invention is applied to a conductive film, for example, the packing density of conductive material can be increased like the conductive film formed by the sputtering process, achieving a very low resistivity. The inhibition of crack occurrence upon drawing means that electrical disconnection in the in-plane direction does not occur even when the conductive film is bent or folded by external forces.

Also where the microparticulate-containing layer is an electrically conductive film, the surface resistivity after drawing 10% falls within 10 times greater than the surface resistivity prior to drawing. In contrast, a conductive film containing such an amount of resin that the resin may functional as the binder has an infinite surface resistivity when drawn 10%.

Accordingly, a conductive film exhibiting a very high performance and very high reliability is implemented by the invention. The inhibited development of cracks upon drawing and the inhibited change of contact between functional microparticulates upon drawing are equivalently accomplished even when functional microparticulates other than conductive microparticulates are used. Accordingly, high performance and high reliability are ensured even when the invention is applied to functional films other than the conductive film.

In the invention, the function of the functional film is not critical. The functional film of the invention encompasses films having a variety of functions, such as a conductive film, magnetic film, ferromagnetic film, dielectric film, ferroelectric film, electrochromic film, electroluminescent film, insulating film, light-absorbing film, selective light-absorbing film, reflective film, anti-reflection film, catalyst film and photocatalyst film.

The functional microparticulates present in the microparticulate-containing layer may be suitably selected from among inorganic particles and/or organic particles, depending on the desired function. Of these, inorganic microparticulates having cohesive force are preferred though not critical. The invention ensures to provide a functional film having a sufficient mechanical strength even when any type of functional microparticulates are used, and eliminates the disturbances of binder resin used in large amounts in the prior art coating process. As a result, the desired function is more improved.

The conductive microparticulates used in the preparation of transparent conductive film are not critical as long as they does not substantially compromise the transparency of conductive film. For example, use is made of conductive inorganic microparticulates such as tin oxide, indium oxide, zinc oxide, cadmium oxide, antimony-doped tin oxide (ATO), fluorine-doped tin oxide (FTO), tin-doped indium oxide (ITO), and aluminum-doped zinc oxide (AZO). Transparent microparticulates of barium sulfate or the like surface coated with inorganic materials such as ATO and ITO are also useful. Of these, ITO is preferred in that conductivity is more improved. Besides, conductive microparticulates of organic matter may also be employed. Such conductive microparticulates of organic matter include, for example, resin microparticulates surface coated with a metal. Implementation of the invention ensures good conductivity.

As used herein, the term "transparent" means that visible light is transmitted by the layer. With respect to the degree of light scattering, the required level varies with a particular application of the conductive film. In the invention, a film having a degree of scattering generally referred to as translucency is also encompassed.

In the preparation of ferromagnetic films, use is made of iron oxide base magnetic powders such as $\gamma\text{-}Fe_2O_3$, $Fe_3O_4$, Co—$FeO_x$ and Ba ferrite and ferromagnetic alloy powders based on ferromagnetic metal elements such as $\alpha$ Fe, Fe—Co, Fe—Ni, Fe—Co—Ni, Co and Co—Ni. Implementation of the invention improves the saturated magnetic flux density of a magnetic coating.

In the preparation of dielectric films and ferroelectric films, use is made of microparticulates of dielectric materials or ferroelectric materials such as magnesium titanate, barium titanate, strontium titanate, lead titanate, lead zirconate titanate (PZT), lead zirconate, lanthanum-added lead zirconate titanate (PLZT), and magnesium silicate base materials, and lead-containing perovskite compounds. Implementation of the invention improves the dielectric or ferroelectric properties of a film.

In the preparation of metal oxide films developing a variety of functions, use is made of microparticulates of metal oxides such as iron oxide ($Fe_2O_3$), silicon oxide ($SiO_2$), aluminum oxide ($Al_2O_3$), titanium dioxide ($TiO_2$), titanium oxide (TiO), zinc oxide (ZnO), zirconium oxide ($ZrO_2$) and tungsten oxide ($WO_3$). Implementation of the invention increases the packing of metal oxide in the film, improving various functions. Particularly, when $SiO_2$ or $Al_2O_3$ having a catalyst supported thereon is used, a porous catalyst film having a practical strength is obtained. When $TiO_2$ is used, an improvement in photo-catalysis function is achieved. Further, when $WO_3$ is used, the color development of a electrochromic display device is improved.

In the preparation of electroluminescent films, zinc sulfide (ZnS) microparticulates are used. Implementation of the invention ensures that an electroluminescent film is formed by a coating process and at a low cost.

These functional microparticulates have an average primary particle diameter (r) whose preferred range differs depending on a particular application of the functional film, for example, on the necessary degree of scattering. The preferred average primary particle diameter (r) also differs with the shape of particles. In general, the average primary particle diameter (r) is preferably up to 10 $\mu$m, more preferably up to 1.0 $\mu$m, and even more preferably 5 nm to 100 nm, although this range is not critical.

It is preferred that the microparticulate-containing layer do not contain a resin at least during the compression. That is, a resin content of zero is preferred. In the conductive film, for example, if the resin is absent, it never happens that the resin prevents contact between conductive microparticulates. Then the conduction between conductive microparticulates is ensured, resulting in a conductive film having a low resistivity. Also, in a microparticulate-containing layer using $WO_3$ or $TiO_2$ microparticulates, various functions are improved in the absence of resin, because it never happens that the resin obstructs mutual contact between microparticulates. Further, in a catalyst film using $Al_2O_3$ microparticulates, if a resin is not used, it never happens that the resin covers surfaces of microparticulates having a catalytic function. Consequently, the catalytic function is improved. In the catalyst film, more voids within the film present more active sites for catalysis, and in this regard too, minimizing or eliminating the use of resin is preferred.

It is understood, however, that the functional film of the invention can contain an amount of a resin as long as the amount does not substantially compromise the function such as conductivity. The acceptable amount is small as compared with the amount of resin used as the binder in the prior art. For example, the upper limit of the amount of resin in the functional film is such that it does not function as a binder. Illustratively, the resin amount is preferably less than 25 parts, more preferably less than 20 parts, and even more preferably less than 3.7 parts by volume, based on 100 parts by volume of conductive microparticulates.

It is preferred from the standpoint of electric resistance and other functions that the functional film do not contain a resin, although a resin is effective for reducing the light scattering of the functional film. Accordingly, if desired in consideration of both haze improvement and functional improvement, the resin may be added in a suitable amount within the above volume ratio range.

The type of resin that can be contained in the functional film is not critical. For example, thermoplastic resins or polymers having rubber elasticity may be used alone or in admixture of two or more. Illustrative resins include fluoro-polymers, silicone resins, acrylic resins, polyvinyl alcohol, carboxymethyl cellulose, hydroxypropyl cellulose, regenerated cellulose, diacetyl cellulose, polyvinyl chloride, polyvinyl pyrrolidone, polyethylene, polypropylene, SBR, polybutadiene, and polyethylene oxide.

More particularly, the fluoro-polymers include polytetrafluoroethylene, polyvinylidene fluoride (PVDF), vinylidene fluoride-ethylene trifluoride copolymers, ethylene-tetrafluoroethylene copolymers, and propylene-tetrafluoroethylene copolymers. Fluorinated polymers in which hydrogen atoms on the backbone are substituted with alkyl groups are also useful. A resin having a higher density is preferred because a large weight of the resin used has a smaller volume.

In the practice of the invention, the functional film is prepared using a functional paint in the form of a liquid having dispersed therein functional microparticulates selected from the above-enumerated variety of functional microparticulates in accordance with a particular purpose of the functional film. The functional paint is applied onto a support and dried to form a microparticulate-containing coating. The microparticulate-containing coating is then compressed, yielding a compressed layer of functional microparticulates, that is, microparticulate-containing layer.

The liquid in which functional microparticulates are dispersed is not critical and may be selected from various known liquids. Exemplary liquids include saturated hydrocarbons such as hexane, aromatic hydrocarbons such as toluene and xylene, alcohols such as methanol, ethanol, propanol, and butanol, ketones such as acetone, methyl ethyl ketone, methyl isobutyl ketone, and diisobutyl ketone, esters such as ethyl acetate and butyl acetate, ethers such as tetrahydrofuran, dioxane, and diethyl ether, amides such as N,N-dimethylformamide, N-methylpyrrolidone (NMP) and N,N-dimethylacetamide, halogenated hydrocarbons such as ethylene chloride and chlorobenzene, and cyclohexanone. Of these, polar liquids are preferred, and in particular, those liquids having affinity to water as exemplified by alcohols such as methanol and ethanol and amides such as NMP are best suited because their dispersing capability is good even in the absence of dispersant. These liquids may be used alone or in admixture of two or more. A dispersant may be used, depending on the type of liquid.

Water may also be used as the liquid. When water is used, the support must be hydrophilic. Resin films are generally hydrophobic and repellent to water, with the difficulty to form a uniform coating. Where the support is a resin film, water must be admixed with alcohol or the surface of the support be made hydrophilic.

The amount of liquid used is not critical and may be determined such that the dispersion of microparticulates may have a viscosity suitable to apply. Illustratively, about 100 to about 100,000 parts by weight of the liquid is used per 100 parts by weight of the microparticulates. In a particular example, the amount of liquid is determined as appropriate in accordance with the type of microparticulates and the type of liquid.

Any well-known dispersion technique may be used in dispersing the microparticulates in the liquid. For example, dispersion can be carried out by means of a sand grinder mill. Upon dispersion, the use of such media as zirconia beads is sometimes preferred in order to disintegrate the agglomeration of microparticulates. Upon dispersion, care must be taken to avoid introduction of debris, dust and impurities.

In the dispersion of microparticulates, various additives may be blended insofar as they meet the performance required for various functions such as conductivity and catalysis. Such additives include, for example, UV absorbers, surfactants and dispersants.

The support is not critical and may be selected from among resin films, glass, ceramics, metals (inclusive of alloys), fabrics and paper. However, glass and ceramics have a high possibility of breakage upon the subsequent compression step, and this must be taken into account. The support used herein can take the form of foil, mesh and woven fabric as well as film.

The preferred support is a resin film which does not crack during the compression step even when the compression force is increased. The resin film is also advantageous in that the microparticulate-containing layer is adherent to that film as will be described later, and suited in the application where a weight reduction is desired. The invention allows a resin film to be used as the support because the compression and firing steps at high temperature are eliminated from the process of forming the microparticulate-containing layer.

The resin films used herein include, for example, polyester films such as polyethylene terephthalate (PET), polyolefin films such as polyethylene and polypropylene, polycarbonate films, acrylic films, and norbornene films (e.g., Arton from JSR Corp.).

For relatively soft resin films such as PET films, the compression step after drying brings about a situation as if functional microparticulates in contact with the resin film were embedded in the resin film whereby the microparticulate-containing layer is tightly joined to the resin film. For hard supports like glass or resin films having a hard surface, the adhesion between the microparticulate-containing layer and the support is poor because microparticulates are not embedded in the support. In this case, it is recommended to previously form a soft resin layer on the glass surface or hard film surface, and apply microparticulates onto the resin layer, followed by drying and compression. After the compression, the soft resin layer may be cured with heat or UV radiation.

It is preferred that the soft resin layer be not dissolved in the liquid of dispersed microparticulates. If the resin layer is dissolved in the dispersion liquid, the liquid containing dissolved resin can reach around the functional microparticulates due to a capillary phenomenon, eventually compromising the film function. This means that when a conductive film is formed, its resistivity is increased, and when a catalyst film is formed, its catalysis function is exacerbated.

Where the support is of metal, use of a soft metal raises no particular problem, but use of a hard metal should preferably be preceded by the surface treatment of the support with a resin (e.g., provision of a resin layer) because the adhesion between the microparticulate-containing layer and the support is poor.

The dispersion liquid of functional microparticulates is applied onto the support and dried to form a microparticulate-containing coating. The application of the microparticulate dispersion liquid onto the support may be carried out by any desired one of well-known techniques. The application techniques which can be used include, for example, reverse roll, direct roll, blade, knife, extrusion nozzle, curtain, gravure roll, bar, dip, kiss and squeegee coating techniques. It is also possible to apply the dispersion liquid onto the support as by spraying or atomizing.

The preferred drying temperature differs with the type of the liquid used for dispersion and the material of which the support is made, although a temperature of about 10° C. to about 150° C. is preferred. Below 10° C. moisture in air tends to condense. Above 150° C. the support in the form of a resin film can be deformed. During the drying step, care must be taken so as to prevent impurities from depositing on surfaces of microparticulates.

The thickness of the microparticulate-containing coating after drying may be determined as appropriate depending on the compression conditions of the subsequent step and the application of the functional film although a thickness of about 0.1 μm to about 10 μm is often appropriate.

By dispersing functional microparticulates in a liquid, applying the dispersion and drying as mentioned above, a uniform film can be easily formed. When the dispersion liquid of microparticulates is applied and dried, the microparticulates can form a film despite the absence of a binder in the dispersion. Although the reason why microparticulates form a film despite the absence of binder is not well understood, it is presumed that as the liquid becomes depleted upon drying, microparticulates gather together to form a film due to capillary action, combined with strong cohesive forces attributable to a large surface area characteristic of microparticulates. At this point, however, the film is weak. In the case of a conductive film, its electrical resistivity is high with a large variation.

Next, the microparticulate-containing coating is compressed, obtaining a compressed film. Since microparticulates in themselves tend to agglomerate together, compression results in a robust film. That is, compression increases the number of contacts between functional microparticulates and hence, the contact surface to boost the film strength.

For a conductive film, its electrical resistivity lowers as its strength increases. For a catalyst film, the coating becomes a porous film as its strength increases, because no or little resin is used. As a consequence, a better catalysis function is obtainable. For other functional films, high-strength films having microparticulates concatenated together are obtainable, and the packing of microparticulates per unit volume is increased because the resin content is zero or very small. As a consequence, the respective functions are enhanced.

Compression is preferably effected under a compression force of at least 44 N/mm$^2$. Under a low pressure below 44 N/mm$^2$, the microparticulate-containing coating may not be fully compressed, failing to form a high-performance functional film such as a conductive film having improved conductivity. A compression force of at least 135 N/mm$^2$ is more preferred, and a compression force of at least 180 N/mm$^2$ even more preferred. As the compression force increases, the coating strength increases, the adhesion to the support improves, and specifically, a conductive film becomes more conductive. It is understood that as the compression force increases, the apparatus must be accordingly more pressure resistant. Thus, a compression force of up to 1,000 N/mm$^2$ is usually appropriate. Compression is preferably carried out at a temperature near room temperature (15 to 40° C.) The possibility of compression at a temperature near room temperature is one of the advantages of the invention.

The compression means is not critical and may be a sheet press, roll press or the like. Use of a roll press machine is preferred. The roll press machine is configured to compress a film between a roll and another roll while rotating the roll. The roll press machine can apply a high pressure uniformly and ensures production on a roll-to-roll basis, leading to an improved productivity.

The rolls of the roll press machine are preferably set at room temperature. If roll pressing is carried out in a hot atmosphere or if compression is carried out with heated rolls (i.e., hot pressing), the support in the form of a resin film can be inconveniently elongated when the compression pressure is increased. If the compression pressure is reduced in order to prevent the resin film (serving as the support) from being elongated at elevated temperature, then the mechanical strength of the coating lowers and in the case of a conductive film, its electrical resistivity increases. Where it is desired for some reason to minimize the deposition of moisture to microparticulate surfaces, a heated atmosphere may be employed in order to reduce the relative humidity of the atmosphere. However, the heated temperature should be within the range where the resin film is not readily elongated, and most often, within the temperature range below the glass transition temperature (or secondary transition temperature) of the resin film. With humidity variations taken into account, a temperature slightly higher than the temperature at which the required humidity is reached may be set. When the roll press machine is operated for continuous compression, it is preferably temperature controlled so that the roll temperature may not be so elevated by the heat generated.

It is noted that the glass transition temperature of a resin film is determined by measuring the dynamic viscoelasticity thereof and denoted by the temperature at which the dynamic loss of major dispersion peaks. For instance, PET film has a glass transition temperature of about 110° C.

If supports such as metals and ceramics have a high heat resistant temperature, they may be treated a high temperature. For metal supports, for example, an atmosphere heated to the temperature range within which the metal does not melt may be employed.

In the roll press machine, metallic rolls are preferred because a high pressure is applicable. If the roll surface is soft, microparticulates can be transferred to the roll during compression, and it is then recommended to treat the roll surface with a hard coating (for example, provision of a hard metal layer).

In this way, a compressed layer containing functional microparticulates is formed. The thickness of the compressed layer is usually about 0.1 μm to about 10 μm although the thickness depends on a particular application. The series of steps of applying a dispersion liquid of microparticulates, drying and compression may be repeated until a compressed layer as thick as about 10 μm is obtained. It is, of course, possible in the practice of the invention to form functional films on both sides of a support. The functional films obtained by the aforementioned procedure possess various functions such as improved electrical conductivity and catalysis and have a practically acceptable film strength and improved adhesion to the support although they are prepared using no binder resin or only a small amount of a resin insufficient to serve as a binder.

Figure 2:
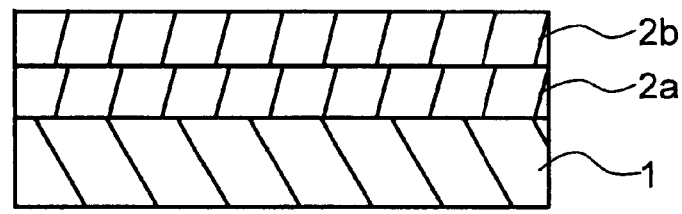
FIG. 2 is a schematic cross-sectional view of a functional film according to another embodiment of the invention.

The functional film of the invention may either consist of one or more microparticulate-containing layers or be a laminate of a microparticulate-containing layer and another layer or layers. FIG. 1 illustrates one exemplary construction wherein a microparticulate-containing layer 2 is formed on a support 1. FIG. 2 illustrates another exemplary construction wherein two microparticulate-containing layers 2a and 2b are laminated.

Figure 3:
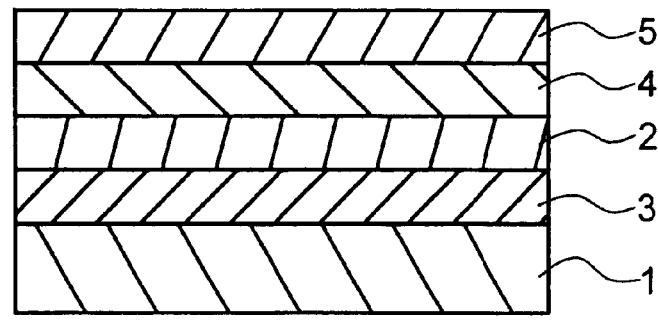
FIG. 3 is a schematic cross-sectional view of a functional film according to the invention as applied to a transfer type composite film.
Figure 4A:
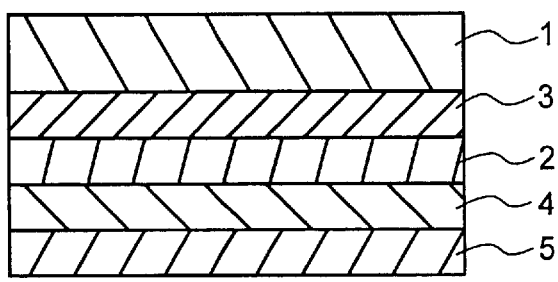
FIGS. 4A to 4D are schematic cross-sectional views illustrating the transfer steps of the transfer type composite film shown in FIG. 3.
Figure 4B:
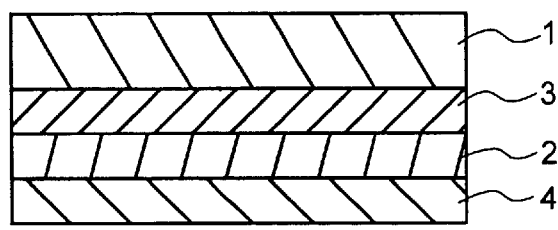
Figure 4C:
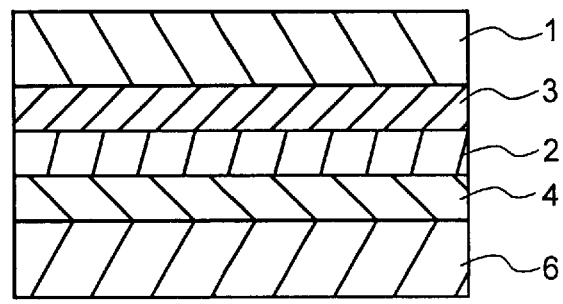
Figure 4D:
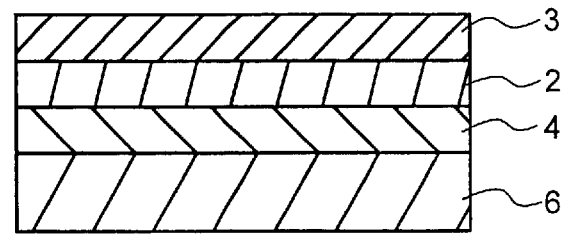

Once formed on a support, the functional film of the invention may be transferred to another support. FIG. 3 illustrates an exemplary construction of a functional film which can be transferred. This functional film is a laminate wherein a hard coat layer 3, a microparticulate-containing layer 2, an adhesive layer 4 and a separator 5 are successively stacked on a support 1 in the form of a resin film. The functional film is transferred by turning upside down the laminate (FIG. 4A), removing the separator 5 to expose the adhesive layer 4 (FIG. 4B), and joining the structure to a member 6 serving as the other support (FIG. 4C). Finally, the support 1 is removed, leaving the structure wherein the microparticulate-containing layer 2 protected with the hard coat layer 3 is disposed on the member 6 (FIG. 4D). Since the member 6 need not be subject to the compression step unlike the support 1, no particular limits are imposed on the shape, size and other factors of the member 6. The member 6 may be made of any desired material as long as the laminate can be transferred thereto, and a choice may be made among glass, resins and ceramics.

It is noted that a joint layer is disposed between the microparticulate-containing layer 2 and the hard coat layer 3 if necessary.

The hard coat layer 3 is effective particularly for improving the scratch resistance of the microparticulate-containing layer. Any desired hard coat layer may be used as long as it can be formed on the microparticulate-containing layer and has a desired strength. For example, thermosetting hard coat compositions based on silicone, acrylic and melamine components may be used. Of these, silicone-base hard coat compositions are advantageous because of a high hardness.

Additionally, use may be made of UV-curable hard coat compositions including radical-polymerizable hard coat compositions such as unsaturated polyester resin and acrylic resin based ones and cation-polymerizable hard coat compositions such as epoxy and vinyl ether based ones. The UV-curable hard coat compositions are preferable from the manufacturing standpoints including curing reactivity. Of these, radical-polymerizable acrylic hard coat compositions are desirable for curing reactivity and surface hardness.

The hard coat layer 3 may be formed by applying the hard coat composition or optionally, a solution thereof in a solvent onto the support 1, followed by drying and curing.

The application of the hard coat composition may be carried out by well-known techniques using a roll coater such as a gravure cylinder coater or reverse-roll coater, Mayer bar coater and slit die coater.

After application, the coating is dried in an appropriate temperature range and then cured. Specifically, thermosetting hard coat compositions are cured by applying suitable heat, and more specifically, silicone base hard coat compositions may be cured by holding at about 60° C. to about 120° C. for about one minute to about 48 hours. UV-curable hard coat compositions may be cured by using a UV irradiation source such as a xenon lamp, low-pressure mercury lamp, medium-pressure mercury lamp, high-pressure mercury lamp, ultra-high-pressure mercury lamp, metal halide lamp, carbon arc lamp or tungsten lamp and irradiating UV in a dose of about 200 to 2,000 mJ/cm$^2$.

The adhesive layer may be selected from well-known adhesive materials which can bond the microparticulate-containing layer to the member. Of these materials, photocurable materials are especially preferred. Illustratively, use may be made of such pressure-sensitive adhesives as rubber base adhesives, acrylic base adhesives, silicone base adhesives, vinyl alkyl ether base adhesives, polyvinyl alcohol base adhesives, polyvinyl pyrrolidone base adhesives, polyacrylamide base adhesives and cellulose base adhesives. The thickness of the adhesive layer may be determined as appropriate in accordance with, in part, the necessary binding force for a particular purpose.

The joint layer which is optional serves to improve the joint and bond between the microparticulate-containing layer and the hard coat layer. Since the hard coat layer is often less adherent to the microparticulate-containing layer, the intermediacy of the joint layer achieves a tight bond to the microparticulate-containing layer. For the joint layer, a resin capable of providing a strong bond to both the microparticulate-containing layer and the hard coat layer may be used. Exemplary resins include acrylic, silicone, urethane and vinyl chloride resins. A UV absorber or IR absorber may be incorporated in the joint layer. It is also possible to incorporate silica and similar fines insofar as this does not adversely affect the tight bond.

The functional film constructed as above, especially one configured as in FIG. 1, finds use as an electrical conductive material in touch panels and film heaters and an electromagnetic barrier material in electromagnetic wave shields for plasma display panels (PDP). The functional film configured as in FIG. 2 finds use as an electrical conductive material of electrodes for inorganic EL devices and solar batteries. The functional film configured as in FIG. 3 finds use as an electrical conductive material for antistatic purposes to glass and resin plates (especially in semiconductor clean room and building glazing), an electromagnetic barrier material in electromagnetic wave shields for CRT and PDP, and an IR barrier material for high-heat-insulating sealed double-glazed units (Low-E).

EXAMPLE

Examples of the invention are given below by way of illustration and not by way of limitation.

Sample No. 1

To 100 parts by weight of ITO microparticulates having an average primary particle diameter of 20 nm (Dowa Industry Co., Ltd.) was added 300 parts by weight of ethanol. This was dispersed in a dispersing machine using zirconia beads as the dispersing medium. The resulting coating liquid was applied onto a support (PET film) of 50 $\mu$m thick by means of a bar coater, and dried by blowing hot air at 50° C. The coating thus formed had a thickness of 1.6 $\mu$m. The film having the coating formed thereon is referred to as uncompressed film, hereinafter.

First, a preliminary test was carried out to ascertain a compression pressure.

Using a roll press machine equipped with a pair of metal rolls having a diameter of 140 mm (roll surface treated with hard chromium plating), an uncompressed film was clamped and compressed between the rolls at room temperature (23° C.) while the rolls were not rotated or heated. At this point, the pressure applied per unit length in a transverse direction of the film was 660 N/mm. Then the pressure was relieved and the length of the compressed portion of the film in a longitudinal direction was measured to be 1.9 mm. This result indicates that the film was compressed under a pressure per unit area of 347 N/mm$^2$.

Next, an uncompressed film similar to that used in the preliminary test was clamped between the metal rolls and compressed therebetween under the above-described conditions while the rolls were rotated so as to provide a feed rate of 4 m/min. There was obtained sample No. 1 having the compressed ITO-containing coating as a functional film.

The functional film of sample No. 1 was measured for thickness, surface resistivity and film strength. A tensile test of drawing to 10% was carried out on sample No. 1. The functional film after drawing was examined for the presence or absence of cracks, a percent drawing at which cracks occurred, and a surface resistivity after drawing. The ratio of surface resistivity after drawing to surface resistivity before drawing was determined. The results are shown in Table 1. The film strength was determined as the results of a 90° peel test. The tensile test, surface resistivity measurement and 90° peel test were carried out by the procedures described below.

Tensile Test

A test specimen sized 10 mm×100 mm taken out of the sample was set on a tensile tester with a chuck distance setting of 50 mm. Then the specimen was drawn at a pulling rate of 20 mm/min until a percent drawing of 10%, while the functional film was observed for the occurrence of cracks through a magnifier.

Surface Resistivity

A functional film on a test specimen sized 10 mm wide by 100 mm long taken out of the sample was measured for electric resistivity by connecting two terminals of a tester thereto, the resistivity measurement being regarded as surface resistivity prior to drawing. On measurement, the terminals were arranged on the test specimen in a longitudinal direction, the center between the terminals was coincident with the longitudinal center of the test specimen, and the spacing between the terminals was 50 mm. The test specimen was longitudinally drawn as described above, after which the electric resistivity of the functional film was similarly measured, the resistivity measurement being regarded as surface resistivity after drawing.

90° Peel Test

Figure 5A:
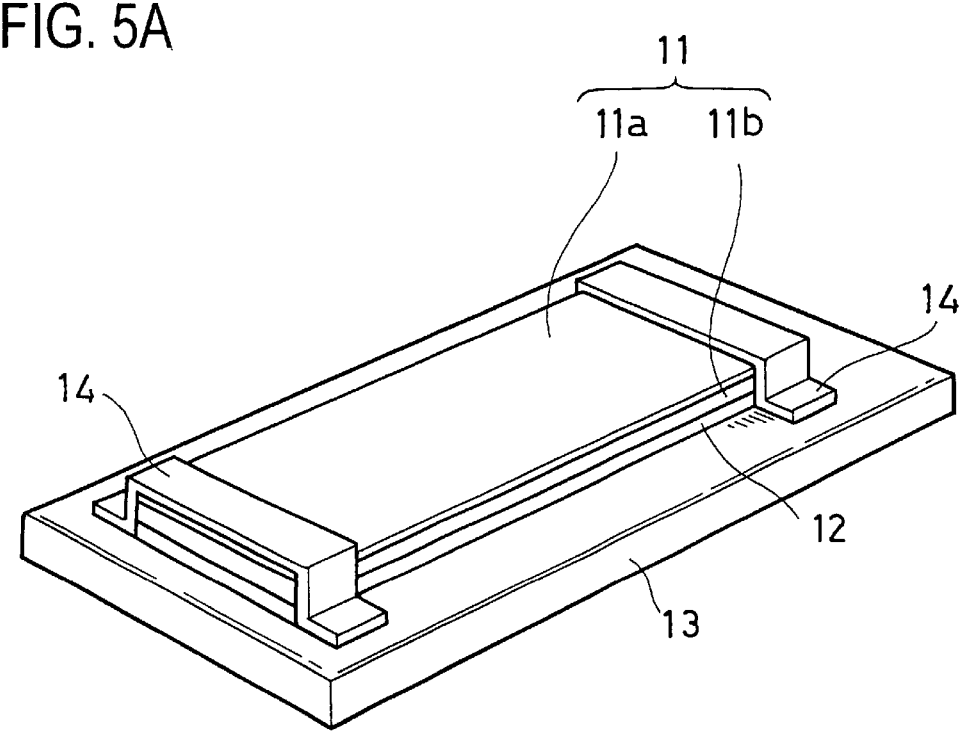
FIGS. 5A and 5B illustrate a 90° peel test used in Examples.

The test is illustrated with reference to FIGS. 5A and 5B.

First, double-sided adhesive tape was attached to the support of a test sample (sample No. 1). The surface of the support to which the adhesive tape was attached was remote from the surface of the support on which the functional film was formed. The test sample having the adhesive tape attached thereto was then cut to a size of 25 mm wide by 100 mm long. Next, as shown in FIG. 5A, the test sample 11 was bonded to a stainless steel plate 13 with the aid of the double-sided adhesive tape 12. In FIG. 5A, 11a designates the functional film and 11b the support. Next, anchoring adhesive tape strips 14 were attached at longitudinal ends of the sample 11 to prevent the test sample 11 from being separated from the stainless steel plate 13.

Figure 5B:
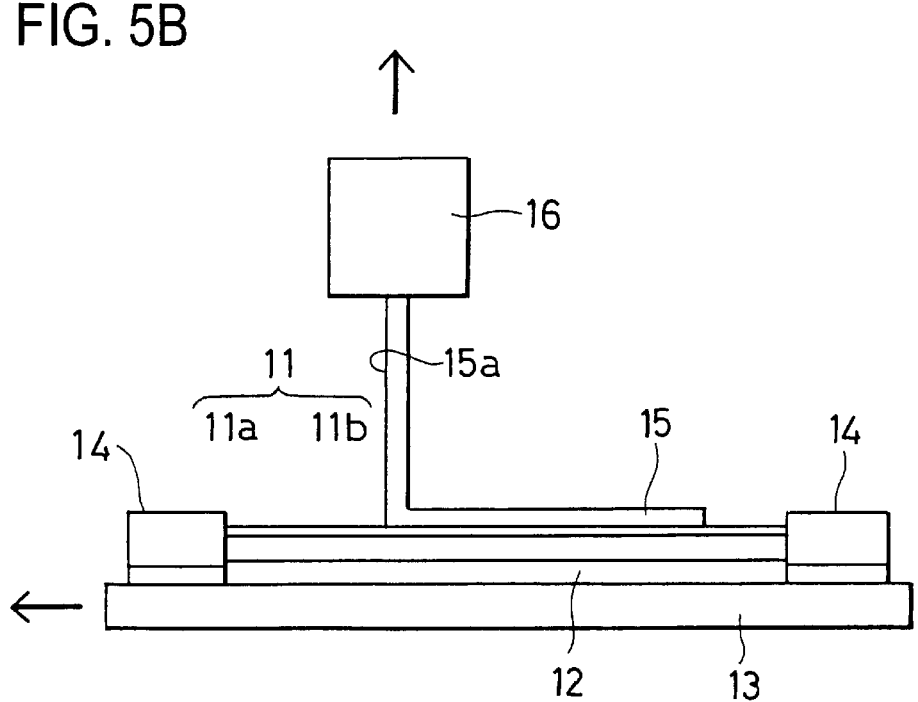

Next, as shown in FIG. 5B, a portion of an adhesive tape strip 15 (12 mm wide, Nitto Denko Co., Ltd., No. 29) was stuck to the surface of the functional film 11a such that its longitudinal sides extended parallel to the longitudinal sides of the test sample 11. The portion of the adhesive tape strip 15 stuck to the test sample 11 had a length of 50 mm. Then the free end of the adhesive tape strip 15 was secured to a tensiometer 16, which was set so that an angle of 90° was defined between the stuck portion and the unstuck portion 15a of the adhesive tape strip 15. With this setting, the adhesive tape 15 was pulled at a rate of 100 mm/min to peel the stuck portion from the functional film while the force F required for peeling was measured by the tensiometer 16. At this point, the unstuck portion 15a of the adhesive tape strip 15 was always maintained at an angle of 90° to the surface of test sample 11 by controlling such that the peeling speed of the adhesive tape 15 was equal to the moving speed of the stainless steel plate 13 to which the test sample 11 was attached.

After the test, the surface of the functional film 11a from which the adhesive tape strip 15 had been peeled and the corresponding (peeled) surface of the adhesive tape strip 15 were examined. When the pressure-sensitive adhesive was left on both the surfaces, it means that a failure did not occur in the functional film, but in the pressure-sensitive adhesive layer of the adhesive tape, that is, the strength of the pressure-sensitive adhesive was equal to the value of force F required for peeling and the strength of the functional film was greater than the force F value.

In the instant test, the upper limit strength of the pressure-sensitive adhesive was 6 N/12 mm. Then, the film strength of 6 N/12 mm reported in Table 1 designates that the pressure-sensitive adhesive was left on both the surfaces, and the strength of the functional film was greater than 6 N/12 mm. A smaller value of film strength designates that the pressure-sensitive adhesive was not left on the surface of the functional film, and the functional film was partially removed and carried to the adhesive tape surface, which indicates that at that value, a failure occurred in the functional film.

Sample No. 2

Sample No. 2 was prepared as was sample No. 1, except that the thickness of the coating was changed by changing the size of the bar coater.

As in sample No. 1, measurements were made on this sample both before and after drawing 10%. The results are shown in Table 1.

Sample No. 3

Sample No. 3 was prepared as was sample No. 2, except that ATO microparticulates having an average primary particle diameter of 20 nm (SN-100P by Ishihara Industry Co., Ltd.) were used instead of the ITO microparticulates.

As in sample No. 1, measurements were made on this sample both before and after drawing 10%. The results are shown in Table 1.

Sample No. 4 (comparison)

A mixture of 100 parts by weight of the ATO microparticulates used in sample No. 3, 100 parts by weight of an acrylic resin (MT408-42 by Taisei Chemical Co., Ltd., solid concentration 50%), and 400 parts by weight of a solvent mixture (MEK:toluene:cyclohexanone=1:1:1) was dispersed in a dispersing machine using zirconia beads as the dispersing medium. The resulting coating liquid was applied onto a support (PET film) of 50 $\mu$m thick and dried to form an uncompressed film. Next, the uncompressed film was compressed under the same conditions as sample No. 1, obtaining sample No. 4.

As in sample No. 1, measurements were made on this sample both before and after drawing 10%. The results are shown in Table 1.

Sample No. 5 (comparison)

Sample No. 5 was prepared as was sample No. 4, except that the amount of acrylic resin was 50 parts by weight and the amount of solvent mixture was 350 parts by weight.

As in sample No. 1, measurements were made on this sample both before and after drawing 10%. The results are shown in Table 1.

Sample No. 6 (comparison)

The support used in sample No. 1 was placed on a substrate, and an ITO film was formed thereon by an RF magnetron sputtering technique using an ITO target. The support having the ITO film thereon is designated sample No. 6.

As in sample No. 1, measurements were made on this sample both before and after drawing 10%. The results are shown in Table 1.

TABLE 1

| Sample No. | Micro-particulates | Functional film thickness (μm) | 90° peel test | Cracks | Drawing at crack occurrence (%) | Surface resistivity Before drawing (kΩ) | Surface resistivity After drawing (kΩ) | After drawing /Before drawing |
|---|---|---|---|---|---|---|---|---|
| 1 | ITO | 0.8 | 6 N/12 mm | nil | — | 4.5 | 32 | 7.1 |
| 2 | ITO | 2.0 | 6 N/12 mm | nil | — | 1.4 | 7.0 | 5.0 |
| 3 | ATO | 2.0 | 6 N/12 mm | nil | — | 92 | 211 | 2.3 |
| 4 (comparison) | ATO | 2.0 | 6 N/12 mm | cracks | 3.3 | 14600 | ∞ | ∞ |
| 5 (comparison) | ATO | 2.0 | 6 N/12 mm | cracks | 4.0 | 1600 | ∞ | ∞ |
| 6 (comparison) | ITO (sputtered film) | 0.4 | 6 N/12 mm | cracks | 2.0 | 200 | ∞ | ∞ |

The effectiveness of the invention is evident from Table 1. The functional film which is free of a binder resin and consists of a compressed microparticulate-containing layer has a fully high film strength. No cracks occur upon 10% drawing, and drawing causes only a small increase in surface resistivity.

In contrast, a coating containing a substantial amount of binder resin has a high surface resistivity prior to drawing, allows cracks to develop upon several percents of drawing, and shows an infinite surface resistivity after 10% drawing. Also, a sputtered film allows cracks to develop upon several percents of drawing, despite a low surface resistivity prior to drawing.

BENEFITS OF THE INVENTION

The functional film of the invention inhibits the occurrence of cracks even when drawn 10% and experiences only a small loss of its function upon drawing, and is thus unsusceptible to reduction or loss of its function even when deformations such as bending, folding and elongation occur. The lowering of production yield due to deformations during the manufacture of the functional film is also minimized.

What is claimed is:

1. A functional film, comprising:
   a compressed microparticulate-containing layer comprising functional microparticulates;
   wherein said microparticulate-containing layer upon drawing does not have cracks even when said microparticulate-containing layer is drawn 10%;
   wherein said functional film has a film strength of at least 6N/12 mm as evaluated by a 90° peel test, wherein said micro-particulate layer does not contain a resin as a binder.

2. The functional film of claim 1, wherein said microparticulate-containing layer is at least one selected from the group consisting of a conductive film, magnetic film, ferromagnetic film, dielectric film, ferroelectric film, electrochromic film, electroluminescent film, insulating film, light-absorbing film, selective light-absorbing film, reflective film, anti-reflection film, catalyst film and photo-catalyst film.

3. The functional film of claim 1, which is provided on a support.

4. The functional film of claim 3, wherein said support comprises a resin.

5. The functional film according to claim 1, wherein said functional microparticulates are inorganic microparticulates selected from the group consisting of tin oxide, indium oxide, zinc oxide, cadmium oxide, antimony-doped tin oxide, flurine-doped tin oxide, tin-doped oxide and aluminum-doped oxide.

6. The functional film according to claim 1, wherein said functional microparticulates are transparent microparticulates of barium sulfate coated with antimony-doped tin oxide or tin-doped indium oxide.

7. The functional film according to claim 1, wherein said functional microparticulates are conductive microparticulates of organic matter.

8. The functional film according to claim 1, wherein said functional microparticulates have an average primary particle diameter of up to 10 μm.

9. The functional film according to claim 1, wherein said functional microparticulates have an average primary particle diameter of up to 1.0 μm.

10. The functional film according to claim 1, wherein no electrical disconnection in an in-plane direction occurs in said microparticulate-containing layer upon drawing said microparticulate-containing layer 10%.

11. A functional film, comprising:
   a compressed microparticulate-containing layer containing conductive microparticulates;
   wherein the microparticulate-containing layer exhibits a surface resistivity after it is drawn 10% which is at most 10 times greater than the surface resistivity prior to drawing;
   wherein said functional film has a film strength of at least 6N/12 mm as evaluated by a 90° peel test, wherein said micro-particuluate layer does not contain a resin as a binder.

12. The functional film of claim 11, wherein said conductive microparticulates comprise at least one component selected from the group consisting of tin oxide, indium oxide, zinc oxide, cadmium oxide, antimony-doped tin oxide, fluorine-doped tin oxide, tin-doped indium oxide and aluminum-doped zinc oxide.

13. The functional film of claim 11, which is provided on a support.

14. The functional film of claim 13, wherein said support comprises a resin.

* * * * *

UNITED STATES PATENT AND TRADEMARK OFFICE
CERTIFICATE OF CORRECTION

PATENT NO.     : 6,617,018 B2
DATED          : September 9, 2003
INVENTOR(S)    : Kiminori Tamai et al.

It is certified that error appears in the above-identified patent and that said Letters Patent is hereby corrected as shown below:

<u>Title page,</u>
Item [75], Inventors, "Chuo-ku" should read -- Tokyo --, (all occurrence).

<u>Column 15,</u>
Line 60, "micro-particulate layer" should read -- microparticulate-containing layer --.

<u>Column 16,</u>
Line 28, insert -- indium -- after "tin-doped",
Line 29, insert -- zinc -- after "aluminum-doped".
Line 55, "micro-particulate layer" should read -- microparticulate-containing layer --.

Signed and Sealed this

Twenty-seventh Day of January, 2004

JON W. DUDAS
*Acting Director of the United States Patent and Trademark Office*